(12) United States Patent
Chamberlain et al.

(10) Patent No.: US 6,317,880 B1
(45) Date of Patent: Nov. 13, 2001

(54) PATCH SOURCE LIST MANAGEMENT

(75) Inventors: Benjamin C. Chamberlain, Redmond; Malcolm S. Haar, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/261,802

(22) Filed: Mar. 3, 1999

(51) Int. Cl.[7] .................................................. G06F 9/445
(52) U.S. Cl. ............................................. 717/11; 707/203
(58) Field of Search ..................... 717/3, 4, 11; 707/200, 707/201, 203, 204, 205; 709/217, 218, 219, 220, 221, 222, 223; 714/2, 15; 713/100

(56) References Cited

U.S. PATENT DOCUMENTS

| | | | | |
|---|---|---|---|---|
| 5,905,990 | * | 5/1999 | Inglett | 707/200 |
| 6,151,708 | * | 11/2000 | Pedrizetti et al. | 717/11 |
| 6,161,218 | * | 12/2000 | Taylor | 717/11 |
| 6,167,567 | * | 12/2000 | Chiles et al. | 717/11 |
| 6,202,207 | * | 3/2001 | Donohue | 717/11 |
| 6,202,208 | * | 3/2001 | Hoilday, Jr. | 717/11 |
| 6,212,512 | * | 4/2001 | Barney et al. | 707/1 |
| 6,216,175 | * | 4/2001 | Sliger et al. | 710/1 |

OTHER PUBLICATIONS

Chiu, "Win Tips Windows 95", WINDOWS Magazine, Jan 1998, pp. 293–295.*
Amhrein, "Zero Administration for Windows", Networking Solutions, Jan 1998, pp. 25.*

* cited by examiner

Primary Examiner—Kakali Chaki
(74) Attorney, Agent, or Firm—Christensen O'Connor Johnson Kindness PLLC

(57) ABSTRACT

A system and method for managing locations of patch program files via a patch source list. The needed patch program files are identified. A list of alternative patch program file locations is referenced repeatedly until a valid alternative patch program file location is found or until each alternative patch program file location on the patch source list has been referenced. If a valid alternative patch program file location is found, the patch program file is retrieved from that location. New alternative patch program file locations may be added to the patch source list when a user identifies those new locations. The patch source list is continually maintained.

19 Claims, 7 Drawing Sheets

PATCH SOURCE LIST MANAGEMENT

FIELD OF THE INVENTION

The present invention generally relates to computer systems and computer software. More particularly, the present invention relates to computer systems and computer software that enable software program files to be retrieved from alternative sources.

BACKGROUND OF THE INVENTION

Before an application program can first be used, it must typically be installed onto a computer system. The installation procedure generally involves copying executable and data files (the "program files") relating to the application program from a source location to an installed location on the computer. Typically, the source location is an installation disk or location on a network server accessible by the computer system. Often the program files are stored in a compressed format to conserve storage space.

Application programs use a variety of installation technologies to copy the program files from the source location to the computer system. InstallShield Software Corporation's InstallShield, Seagates' WinInstall or Great Lakes Software's Wise Installation System are tools commonly used for generating application installation packages for Microsoft Corporation's Windows platforms. Web-based components such as ActiveX controls may use IExpress packages, which are self-extracting executables with a simple file copy and registry capability.

An application program will often include a special application program (the "set-up program") for administering and performing the installation procedure. Generally, the set-up program is unique to the application program and is customized to install the program files from a predetermined source location to pre-configured locations on the computer system. Often the user is provided the option of redirecting the installation of the program files to other locations on the computer system.

The typical set-up program not only installs the program files to the computer system but also creates entries in a central registration database, such as a system registration database (the "system registry"), which identify the locations of the program files on the computer system. The location may be identified by a "path" to a particular directory or folder of the computer system in which the program files reside. The system registry is typically maintained by the computer system's operating system. While executing, the application program generally queries the operating system for the path to an installed program file, the operating system looks up the path in the system registry, and the operating system returns the path to the executing application program.

This set-up program provides only a very rudimentary way for system administrators and users to know which applications they have installed on their machines and to manage these installed applications. The Microsoft Windows operating system contains an "Add/Remove Programs" control panel, and this control panel is driven by a standard set of registry entries. The Windows 95, Windows 98 and Windows NT 4.0 operating systems can uninstall an application program by invoking a command line provided by this registration information. Products such as Microsoft Systems Management Server can help manage installed applications in a centrally-managed environment. However, these products are limited by the information and control that individual application setup scripts choose to provide, and they do not facilitate source management for users who are in effect their own system administrators. A limitation of current installation technologies is that they look for the program files at a predetermined location. Current installation technologies will not perform satisfactorily if that location is not available. For example, users frequently install software over a network. The installer software will look for the needed program files at a predetermined location, usually a server. If the server goes down and then a user tries installing these program files from the network, the user will be unable to install the desired program files and is without recourse. Similarly, if the installer software expects to find the needed program files on removable media, and the removable media is not mounted when the installer application needs these program files, the installation will fail. Even something as simple as the expected program file having been inadvertently erased from the expected location will bring the software installation process to a halt.

Typically, the Add/Remove Program control panel is used to invoke "maintenance mode" setup for a product. For example, if the user decides that he now wants to install the Spell Check feature though he chose not to do so during the original install, the user goes to the Add/Remove control panel and re-runs the setup procedure to install the Spell Check feature. Depending on the user interface of the particular program, if the original installation source is no longer available, the application will either fail or will interrupt the installation process to prompt the user to manually locate a valid source. The user would either have to find a new source, or the install would fail. Even worse, some application programs do not have the capability to accept an alternate location even if one were provided manually.

When a user installs a product, he may select all of the product's features to run from the network. If the network goes down, the user is unable to use the product's features because the "run-from-source" features could run only from the network source. Users and administrators want a system by which the installer will go to a back-up location to get the needed modules if the network server goes down. This can be done via a distributed file system (DFS). A DFS keeps track of files stored across multiple networks. It converts file names into physical locations. However, everyone does not have access to a DFS, and even where a DFS is available, the administrator must manually re-map the file system before the installer application will look in an alternate location.

The problem of finding a valid source location for a computer program file can arise in a number of different situations, such as when the product is first installed, when the product is later patched, when an installed product is reconfigured, or when a product is configured to "run-from source." These situations will now be briefly described.

With the typical initial installation procedure the user will mount a CD or access a network share and click on the "install" executable. Finding a valid installation source is typically not much of an issue in this situation, since the user would not have been able to invoke the "install" executable if the installation source were not available. However, under certain circumstances it is possible to initiate an original install other than from an install executable at the source location, for example, from the Add/Remove control panel of the Microsoft Windows operating system. The installation software will look to a predetermined source location for the needed software code, and if the source location is not available, the installation will fail.

Subsequent to the original installation of the product, occasions may arise when the user needs to perform additional installation procedures. For example, the product may be patched after installation to correct a programming bug or other infirmity. Often during the course of patching the product, the original source may be required. Moreover, if the product has already been patched and a maintenance mode installation procedure occurs, the program files associated with the patch may be required. For example, a patch may provide patch bits to correct an existing program file that is being installed for the first time during a maintenance mode installation. If the patch is unavailable during the maintenance mode installation procedure, it is possible that the existing program file associated with the product may be newly installed without being patched, or not installed, putting the product in an unstable mode of operation.

Also, if the user originally did not install a spelling checker but subsequently decided this feature was needed, the user would need to install the feature. In the case of the Microsoft Windows operating system, the user can access the Add/Remove control panel to invoke "maintenance mode" setup for a product. The Add/Remove control panel looks to the source from which the original installation was performed. If the source from which the program was originally installed is unavailable, then the user either has to manually find a new source or the install will simply fail.

As an alternative to the Add/Remove control panel, certain applications may install software "on demand." "On demand" installation is really just an automated form of "maintenance mode" installation. When the user selects the spelling checker from, for example, the word processing application, and the selected feature had not previously been installed, the application can automatically install the requested feature. If the original installation source was not available at the time the "on demand" installation is attempted, an alternate source must be located or the installation will fail.

The need to find a valid source location can also arise in circumstances unrelated to installation. For example it is possible for a user to install a product from a network location and configure all of the features to run from the network, rather than having the features installed on the user's local hard drive. When the features are configured to "run from source" and the network then goes down, the features cannot run.

In all of these instances there is a need for a method and software product which will look for alternate source locations in the event that a primary source location is unavailable.

SUMMARY OF THE INVENTION

Stated generally, the present invention relates to a method for reading a computer program file that will look in alternate locations for the computer program file if the file is not in its expected location. The method is thus not dependent upon the computer file being located in a particular source location and is also not dependent upon the source location being found.

Stated somewhat more specifically, the present invention relates to a method of reading a computer program file. The method first looks for the computer program file in a first source location. If the computer program file is not found in the first source location, or if the first source location cannot be found, the method repeatedly references a list of computer program file source locations and looks for the computer program file in each of the source locations on the list in turn until either the computer program file is found or until each source location on the list has been referenced. If the computer program file is found, the computer program file is read from the corresponding source location. According to one embodiment of the invention, the computer program file, once read, is copied at least in part to a computer readable medium, such as the user's local hard disk drive. According to another embodiment the computer program file, once read, is executed, such as in the case of a feature of an application program which is configured to "run from source."

In the disclosed embodiment the list of source locations for the software components is searched in an ordered sequence that is defined by either the system administrator or the user. This ordered sequence is defined such that network source locations, media source locations, and Internet site source locations are categorized in different groups and are then ordered within each group. The installer application remembers the last-used source location. If a valid source location has not been found by the installer application after first referring to the last-used source location and then, if necessary, to each source location on the list, the installer application may prompt the user to identify a new source location. This user prompt can optionally be enabled or disabled by the system administrator. Also, if the user interface level of the install is set to none, no source dialog is displayed to prompt the user to identify a new source location.

Another aspect of the present invention relates to a method of adding a new source location to the source list. The installer application maintains a list of source locations and detects when a new source location has been identified by a user. The installer application then determines whether the new source location is already on the list of source locations. If the new source location is not on the list of source locations, the installer application adds the new source location to the list. In the disclosed embodiment the installer maintains a comprehensive list of source locations, which consists of network source locations, media source locations, and Internet site source locations. The installer application remembers the last-used source location and replaces the last-used source location with a new source location. If it is determined that the new source location is a media source location, this media source location is not added as a new source location to the list of source locations.

In yet another aspect of the invention, the installer program responds to a notification that a patch file has been launched by creating a patch source list within an installer registry. The patch source list includes a path to the original location of the patch file identified at the time the patch file is first applied. In addition, the patch source list includes alternative locations where the patch file may be found, such as on the Internet, in the event the patch file is unavailable at the original location during future installation procedures. Consequently, if a patch file is needed again, the installer program will first attempt to access the patch file at the original location of the patch file. If that attempt fails, the installer application will iteratively search alternative locations stored in the patch source list for the patch file, and attempt to access the patch file at one or more of those alternative locations.

In still another embodiment of the invention, the patch may be provided in two parts: an abbreviated patch file and a separate patch source. Moreover, one abbreviated patch file may be associated with plural patch sources. For instance, the abbreviated patch file may have applicability to multiple versions of an application program with each version requiring a different one of the plural patch sources. The abbreviated patch file may contain sufficient information to allow the installer program to identify which of the plural patch sources is needed for the version of the application program installed on the computer system. Rather than download all of the patch sources related to the patch, the user may download only the abbreviated patch file. From the information stored within the abbreviated patch file, the installer program may identify which of the plural patch sources is applicable to the particular version of the installed application program. Based on that identification, the appropriate patch source may be retrieved, which avoids downloading unnecessary patch sources.

Another aspect of the present invention comprises a computer system containing code for carrying out the aforementioned methods. Yet another aspect of the present invention comprises a computer-readable medium that contains instructions for carrying out the aforementioned methods.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Reference is now made to the drawings, in which like numerals indicate like elements throughout the several views.

Exemplary Operating Environment

Figure 1:
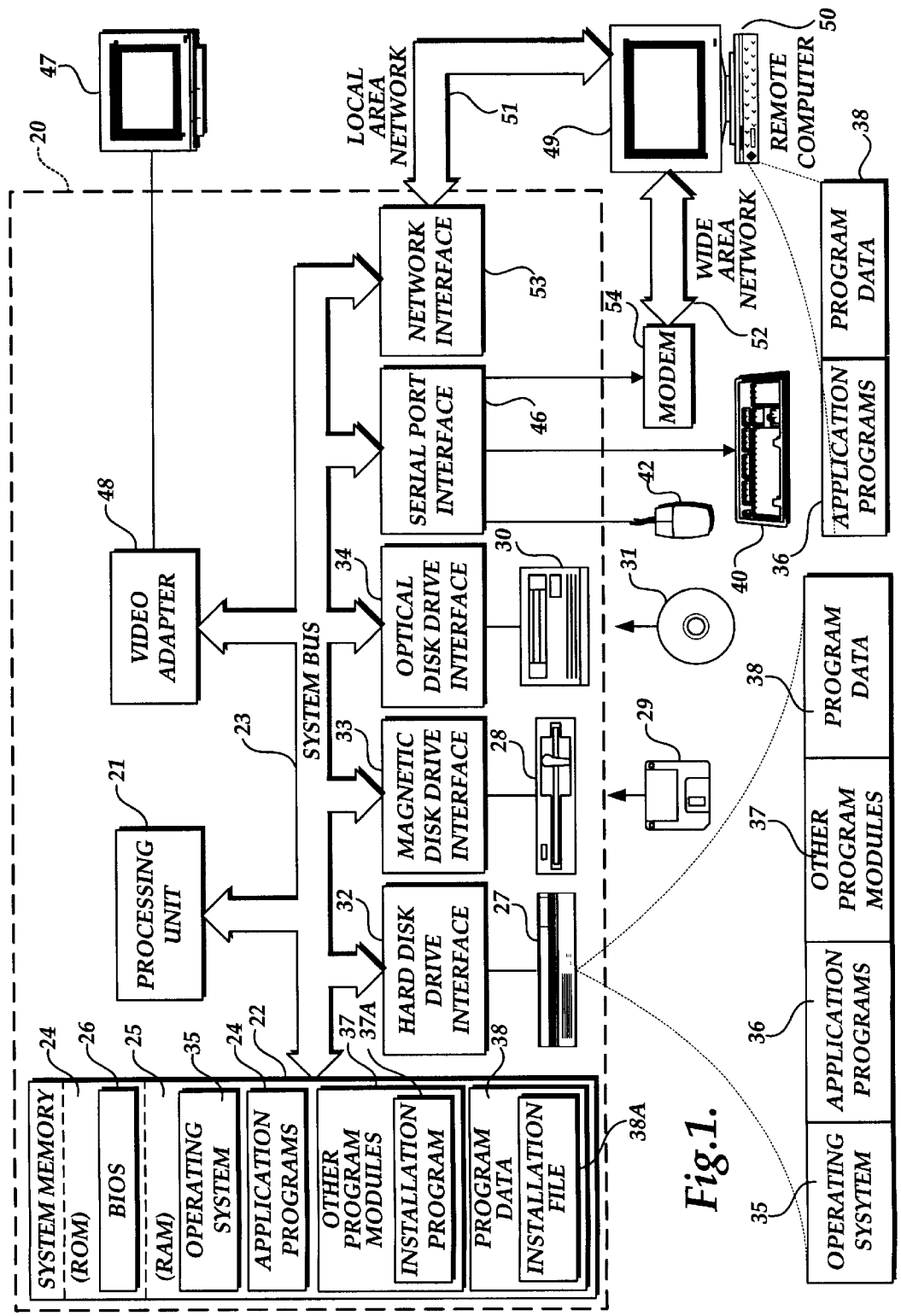
FIG. 1 is a block diagram of a computer that provides a portion of the operating environment for an exemplary embodiment of the present invention.

FIG. 1 and the following discussion are intended to provide a brief, general description of a suitable computing environment in which the present invention may be implemented. Although not required, the invention will be described in the general context of computer-executable instructions, such as a program module or file, running on a personal computer. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory 22 to the processing unit 21. The system memory 22 includes read only memory ("ROM") 24 and random access memory ("RAM") 25. A basic input/output system 26 ("BIOS"), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35; one or more application programs 36, other program modules, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus ("USB"). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a hard disk drive 50 has been illustrated in FIG. 1. The logical connections depicted in FIG. 1 include a local area network ("LAN") 51 and a wide area network ("WAN") 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Example of Installation Procedure

Figure 2:
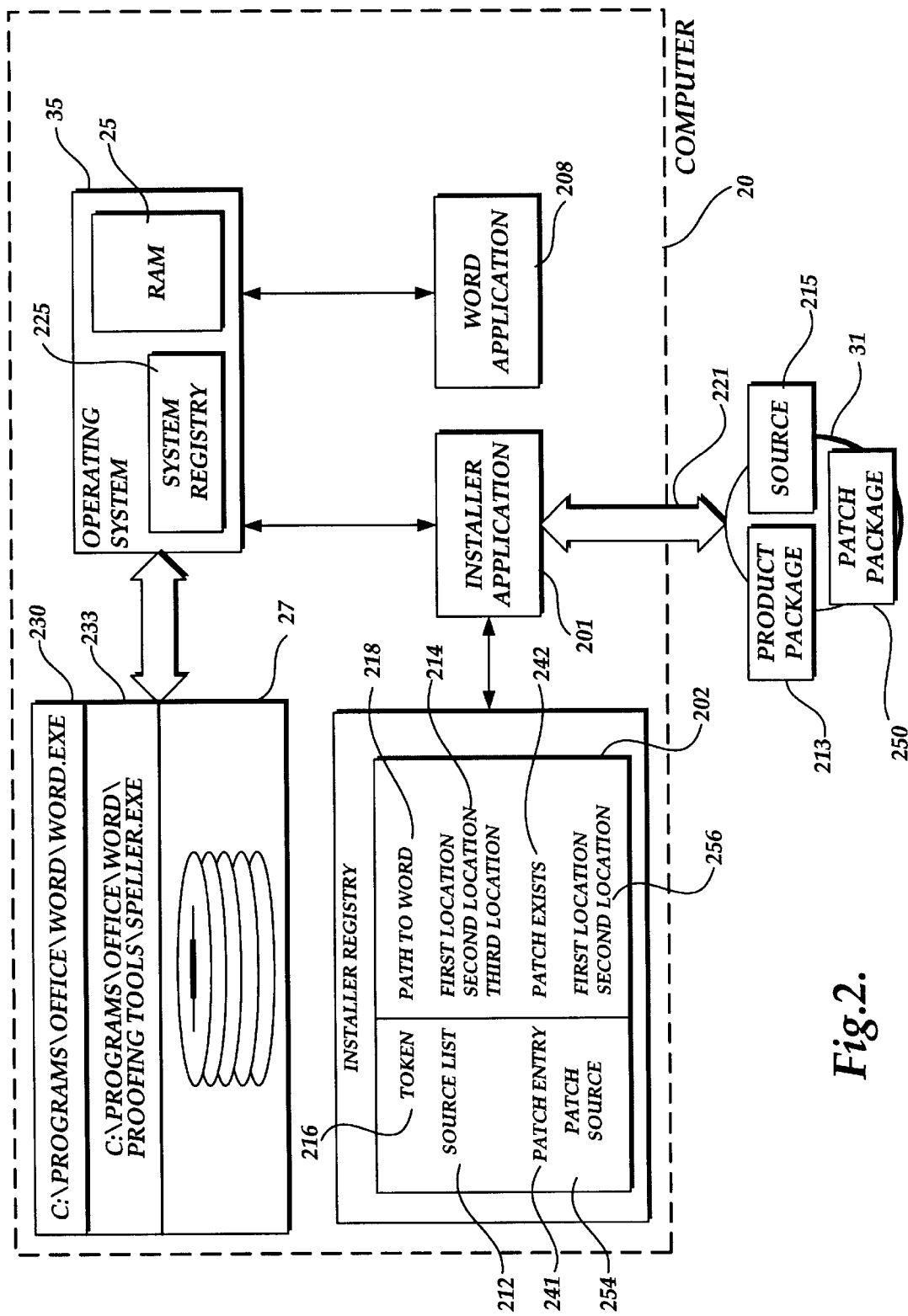
FIG. 2 is a detailed functional block diagram of an environment in which an exemplary embodiment of the present invention may operate.

FIG. 2 is a functional block diagram of a computer environment making use of an installer application 201 constructed in accordance with an exemplary embodiment of the present invention. To begin the example illustrated in FIG. 2, a user initiates the installation of the product, such as the Microsoft Office application program. Initiating the installation may constitute the act of inserting a CD-ROM disk 31 in optical disk drive 30 and then activating or selecting the install command, or the act of executing a remote startup script over a network connection, or any other means of initiating the installation. Once the installation is initiated, the installer application 201 assumes control of processing.

The installer application 201 begins the installation by reading the product package 213 into memory, such as RAM 25. The product package 213 is unique to the product and is essentially a database that describes, among other things, the installation functions that must be performed to install the program files of the product. The product package 213 may include the unique identifiers assigned to each of the resources of the product. Resources such as shortcuts and registry keys are fully described and in a sense "contained" in the product package 213.

The installer application 201 reads the product package 213 and uses the information stored within to determine the installation operations that must be performed for the product. For instance, the installer application 201 may display a dialog box, which presents the user with the option of selecting which features of the product to install. The user may be presented with the option of selecting a "Word" feature, an "Excel" feature, and a "Proofing Tools" feature. The user may then select which features to install to the computer 20. Once the user has selected the desired features of the product, the installer application 201 resolves those features into a listing of resources to be installed, i.e., program files, registry entries, shortcuts, etc.

The source 215 contains the actual resources associated with the product. Those resources making up the selected features are copied from the source 215 to an appropriate location on the computer 20, such as to a folder on the hard-disk drive 27 or to a system registry 225 maintained by the operating system 35. The appropriate location on the computer 20 for a resource may depend upon the type of resource. For instance, if the resource is a program file, the resource may be stored in the file system of the hard-disk drive 27. However, if the resource includes registry keys, the resource may be stored in the system registry 225. If the user identifies a particular location within the file system of the hard-disk drive 27 for the product, the installer application 201 will write the program files associated with the product to that particular location.

In the illustrated example, the installer application 201 installs the program file word.exe 230 to the path "C:\Programs\Office\Word." The program file word.exe 230 may be one resource of the Word feature of the product. In addition, the installer application 201 installs the program file speller.exe 233 to the path "C:\Programs\Office\Word\Proofing Tools." The program file speller.exe 233 may be associated with a "Spell Check" component of the Proofing Tools feature.

During installation, the installer application 201 writes entries in an installer registry 202 corresponding to the resources installed. For example, configuration information related to the product may be stored in the installer registry 202. In addition, a token 216 may be created that corresponds to the program file word.exe 230. A path 218 may be associated with the token 216 and define the location on the hard disk drive 27 where the program file word.exe 230 is stored. These entries enable the installer application 201 to provide the product with enhanced functionality during execution.

The installer application 201 continues with the installation process until all of the resources of the product are written to the appropriate location on the hard disk drive 27. After all of the resources are written, the installer application 201 creates a "source list" 212 in the installer registry 202. If, after installation, the source 215 is needed by the installer application 201, the source list 212 identifies where the source 215 may be found. The initial locations 214 contained in the source list 212 may be derived from information contained in the product package 213, in addition to the location of the product package 213. The first location in the source list 212 is likely to be the location of the source 215 during the present installation, here the CD-ROM disk 31 within the optical disk drive 30. The source list 212 includes a list of alternative locations where the source 215 may be located should the source 215 not be found in the first location searched. The locations may be any location on any media accessible by the computer 20, including on a floppy disk 29, CD-ROM disk 31, network server accessible via a LAN 51, a File Transfer Protocol (FTP) site on the Internet accessible via modem 54 or LAN 51, or any other storage media now known or hereafter developed.

After the source list 212 is created, installation is complete, and the installer registry 202 is populated with an entry for each installed resource. It will be appreciated that alternatives exist to creating entries for each resource. For instance, a "component" may have multiple resources associated with it, and an entry may be created for components rather than individual resources. The installer registry 202 also includes the source list 212 which identifies locations where the source 215 may be found for future use.

Example of Patching Procedure

While the above discussion described an installation, the following discussion describes a "patching" procedure. A patch may be applied to an installed product after installation to revise certain program files of the product. Often a patch is used to correct a programming bug or other infirmity in the original program files of the product. The installer application 201 described is capable of performing the patching procedure necessary to patch the product.

Continuing with FIG. 2, the patching procedure begins when the installer application 201 receives a notification that a patch package 250 has been launched. Although the patch package 250 illustrated in FIG. 2 resides on the CD-ROM disk 31 with the product package 213 and the source 215, generally the patch package 250 does not. More often the patch package 250 is downloaded from a network, such as the Internet, or delivered to the user on a separate medium, such as floppy disk 29. However, for simplicity of discussion only, the patch package 250 is illustrated as collocated with the product package 213 and the source 215.

The patch package 250 is a program file containing the information necessary to revise the product. For instance, the patch package 250 may contain new program files for addition to the product, or may contain patch bits for modifying existing program files of the product. The patch package 250 may also include instructions for the installer application 201 that detail which program files are affected by the patch package 250 and the proper method for revising those affected program files with patch bits or by installing new program files.

In response to the launch of the patch package 250, the installer application 201 may first copy the patch package 250 to a location on the hard disk drive 27 for future use. Then, the installer application reads the patch package 250 and uses the instructions stored within to determine the installation operations that must be performed to apply the patch. Based on those instructions, the installer application 201 revises the installed product in accordance with the instructions in the patch package 250. A complete description of the patching operations performed may be found in U.S. patent Ser. No. 09/261,864, entitled "System and Method for Patching an Installed Application Program", filed concurrently herewith and incorporated herein by reference.

In addition to revising the program files of the product, the installer application 201 also creates or modifies entries in the installer registry 202 to reflect the patch. For example, any program files added by the patch are identified in the installer registry 202, and their locations are stored. Another entry 241 in the installer registry 202 may be created to indicate that the patch exists 242 and has been applied to the product. Such an entry is useful for subsequent installation procedures to ensure that, if the user changes the installed state of the product, the patch may be reapplied as necessary.

Next, a "patch source list" 254 is created in the installer registry 202 describing a list of locations for locating the patch package 250. As discussed above with respect to the source list 212, if the patch package 250 is needed for subsequent installation procedures, the patch source list 254 includes a list of alternative locations for locating the patch package 250 should the patch package 250 be unavailable at its expected location. The initial values 256 for those locations may come from information stored within the patch package 250. For instance the first expected location should be the location on the hard disk drive 27 to which the patch package 250 was copied, as mentioned above. Possible alternative locations may include a network server accessible by the computer 20 over a LAN 51, an Internet site accessible to the computer by modem 54, a CD-ROM disk 31 inserted in the optical disk drive 30, or any other acceptable location. When the patch source list 254 is created in the installer registry 202, the patching operation is complete and the product is once again functional.

The installer application 201, as explained above, functions properly provided the installer application 201 can find the program files that it needs to install. Problems arise if the program files are not where the installer application 201 expects them. For example, if the installer application 201 is looking for a source file on a CD-ROM disk and the user is trying to install from the network, or if the user tries to install from the network and the network goes down, the installation will fail. The installation cannot proceed until an alternate location for a source is found.

The source list 212 is used today in the case where an application has already been partially or completely installed, and a subsequent install is later invoked on that product that requires the source 215. When this subsequent install is invoked, the user is not really installing from any one place. Therefore, locations in the source list 212 are searched, and the first location having the source 215 is used for the install. For example, if the network is down, the original source may not be available. Likewise if the user originally installed from CD, and the CD is not in the CD-ROM drive, then the source list 212 can be used to find alternate source locations.

The patch source list 254 is used if program files installed during the subsequent install just mentioned require patching before use by the product. For instance, if a feature of the product was not installed at the time the patch was applied, a program file associated with that feature could, obviously, not be patched. Consequently, if the feature is subsequently installed, the installer application 201 will apply the patch to the program files of the feature, as needed, during the subsequent install. This procedure requires that the installer application 201 have access to the patch package 250 after the patch was initially applied. Access to the patch package 250 is virtually assured through the use of the patch source list 254.

Searching the Source List

Figure 3A:
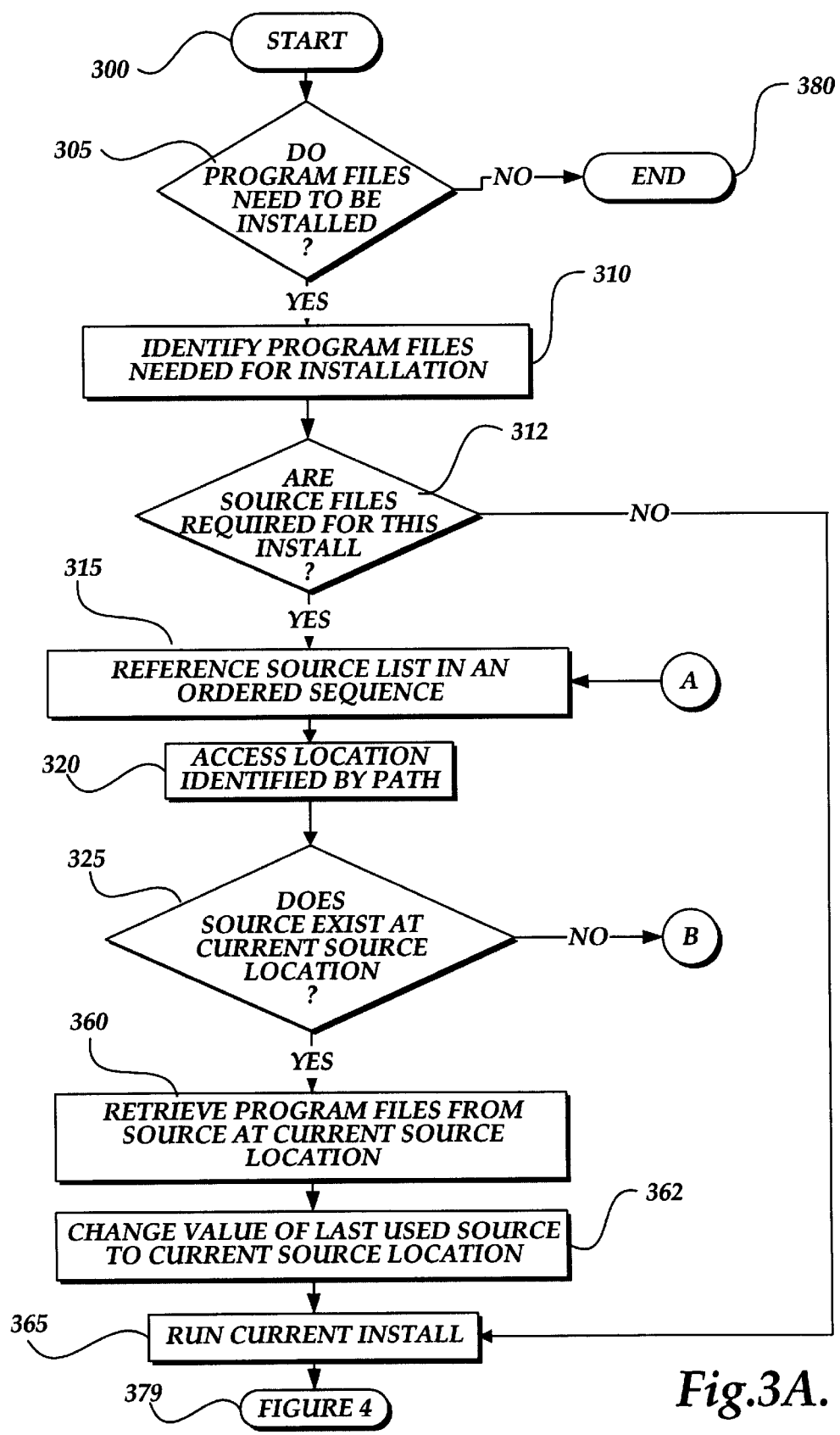
FIGS. 3A and 3B form a flow diagram depicting steps performed by an exemplary embodiment of the present invention to search a source list for the location of resources to be installed.
Figure 3B:
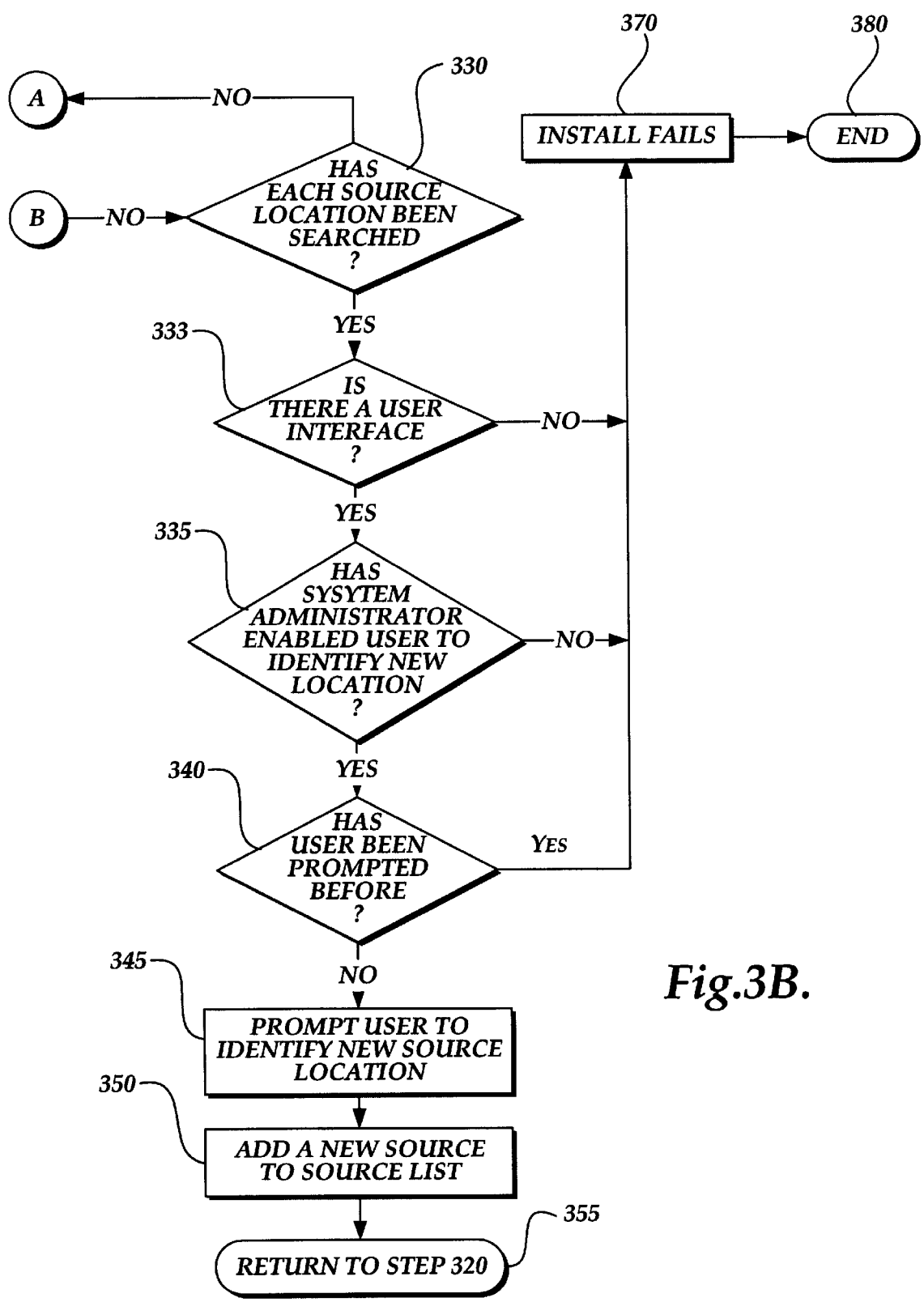

FIGS. 3A and 3B illustrate the steps involved for searching for the source 215 using the source list 212. FIGS. 3A and 3B in conjunction with FIG. 2 provide an overview of the process for searching alternative locations for needed resources when installing a product. The process begins at START step 300 by turning on computer 20. At step 305, based on the user's input, installer application 201 determines if program files need to be installed. For instance the user may have selected to install a product feature previously uninstalled, such as a "Grammar Checking" feature or the like. The new feature may require additional program files not already installed. If no program files need to be installed, the process proceeds to step 380 and terminates. If, however, program files need to be installed, at step 310, installer application 201 then identifies those program files for installation. After identifying the needed program files for installation, at step 312, the installer application determines if the source 215 is required for this install. If the source 215 is not required, processing proceeds to step 365, discussed below.

If the source 215 is required for the install, at step 315, installer application 201 retrieves a location from the source list 212. The location may be a path to a folder on the hard disk drive 27 or other storage medium. The last-used source is typically checked first. In other words, the first location identified in the values 214 of the source list 214 is the path to the last-used location of the source 215. In this example, the last used location is the CD-ROM disk 31 used for the initial installation. In this embodiment of the invention, the default search order is last-used source and then network, media, and URL sources. However, a user can override the default search hierarchy and specify which locations are to be searched next and in what order. The last-used source, the list of network sources, the list of media volume labels, and the list of URL sources, are each stored as values 214 in the source list 212.

Figure 4:
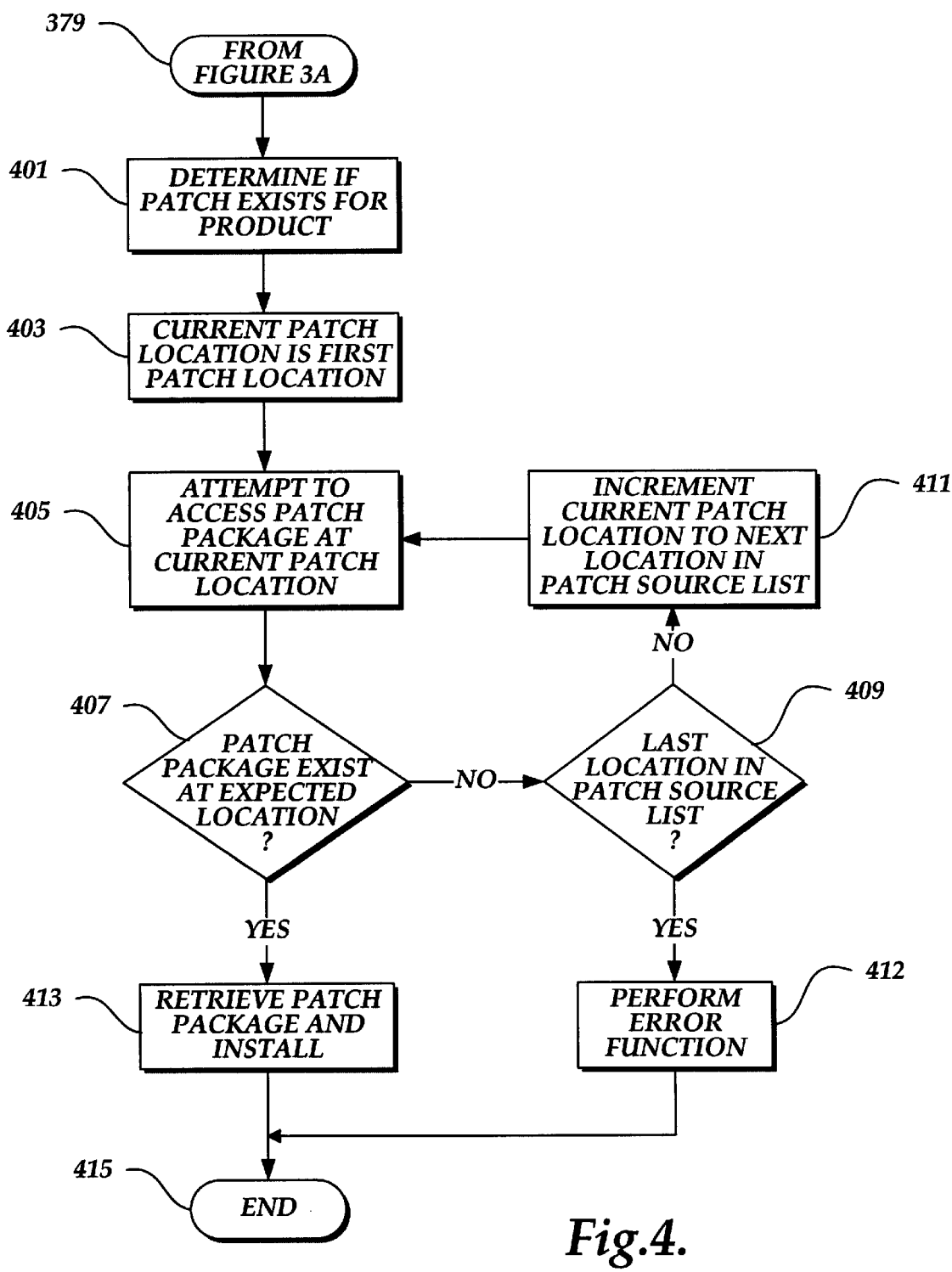
FIG. 4 is a logical flow diagram illustrating the steps performed during a subsequent installation operation to locate a patch file if a patch has been applied to the product.

At step 320, installer application 201 attempts to access the source 215 at the location retrieved at step 315. At step 325, installer application 201 checks the location for validity, meaning the existence of the source 215 at the location is determined. Note, however, for media sources, the installer application 201 merely verifies that the volume label of the medium is correct. The installer application 201 does not actually verify that the source 215 is contained on that medium. If the source 215 exists at the current location, at step 360, installer application 201 retrieves the necessary program files from the source 215 at the current location. The first value 214 of the source list 212 is changed to the current location at step 362. After the last-used source is stored, processing continues to step 365 where the operations for performing the current installation occur. When the installation is complete, the process proceeds to step 380, which is illustrated in FIG. 4 and described below.

Returning to step 325, if the current source location is not valid, i.e., the source 215 does not exist at the current location, processing proceeds to step 330 (FIG. 3B). At step 330 the installer application 201 determines if each location identified in the source list 212 has been searched. If not, processing returns to step 315 and the installer application 201 increments the current source location to the next value 214 in the source list 212. Steps 320 and 325 are then repeated as described above.

If, at step 330, no more source locations remain to be searched from the source list 212, processing proceeds to step 333 and the installer application 201 determines if there is available a user interface for prompting the user to identify a new source location. If there is no such user interface available, processing proceeds to step 370 where the installation fails. If a user interface is available, installer application 201 determines if the system administrator has enabled the user to identify new source locations at step 335. For example, in a networked environment, even though the requisite user interface is available, a system administrator may disable that user interface to prevent unwanted tampering. Thus, if the user interface level of the install is set to none at step 335, processing proceeds to step 370 where the install fails.

If, at step 335, the user is able to identify new source locations, and if the user has not been previously been prompted for new source locations at step 340, then installer application 201 prompts the user to identify a new source location at step 345. At step 350, based on the user input, the installer application 201 adds the new source location to the values 214 in the source list 212. Processing then returns to step 320, where the process performs again as described above. The process ends at step 380.

FIG. 4 is a logical flow diagram illustrating the steps performed during a subsequent installation operation if a patch has been applied to the product. The process illustrated in FIG. 4 enters from step 380 of FIG. 3. From step 380, processing proceeds to step 401 where the installer application 201 determines if a patch has been applied to the product. The installer application 201 may determine if a patch has been applied by querying the installer registry 202. As discussed above, a patch entry 241 in the installer registry was created when the product was patched. Accordingly, the installer application 201 queries the installer registry 202, reads the value 242 associated with the patch entry 241, determines that the patch exists, and processing proceeds to step 403.

At step 403, the installer application 201 sets its current search location to the first location identified in the values 256 stored in the patch source list 254. In the example described above with respect to FIG. 2, the patch package 250 was stored in a folder on the hard disk drive 27, such as a "WINDOWS" folder that contains program files associated with the operating system 35. Processing then continues at step 405.

At step 405, the installer application 201 attempts to access the patch package 250 at the current search location. The installer application 201 may query the operating system 35 to determine the existence of the patch package 250 at the current location. Alternatively, the current location may define a volume label for a medium, such as a floppy disk 29 or CD-ROM disk 31. In that case, the installer application 201 may query the operating system 35 to identify whether a medium is accessible to the computer 20, through a floppy disk drive 28, optical disk drive 30, or other removable medium device. Processing then proceeds to step 407.

From step 407, if the patch package 250 exists at the current location, processing proceeds to step 413 described below. If, however, the patch package 250 does not exist at the current location, processing proceeds to step 409. For instance, if the operating system 35 returns to the installer application 201 an error message indicating that the patch package 250 does not exist at the location, or that the media volume indicated is not available to the computer 20.

At step 409, the installer application 201 determines if the current location is the last location identified in the values 256 within the patch source list 254. If there still remain locations in the patch source list 212 that have not yet been searched, processing proceeds to step 411, where the next location stored in the patch source list 254 is made the current source location and the process returns to step 405, which performs again as described above. If, however, no more locations to search for the patch package 250 remain in the patch source list 254, processing proceeds to step 412.

At step 412, an error function is performed. For instance, the error function may be a routine, similar to steps 333 through 350 of FIG. 3, where the installer application 201 prompts the user for a location for the patch package 250 and returns to step 405. Alternatively, the installation may simply terminate, or an error message may be displayed to the user indicating the absence of the patch package 250 and instructing the user to reapply the patch manually. Processing proceeds from step 412 to ending step 415.

Returning to step 407, if the patch package 250 exists at the current location, then, at step 413, the installer application 201 retrieves the patch package 250 from the current location identified for the patch package 250 and applies the patch substantially as described above with respect to FIG. 2. As mentioned above, a complete discussion of the operations performed to apply a patch is found in U.S. patent application Ser. No. 09/261,864, entitled System and Method for Patching an Installed Application Program, filed concurrently herewith and assigned to the same assignee as the present invention. Once the patch has been applied, the installation is complete and the product again functions normally.

Adding Source Locations to the Source List

Figure 5:
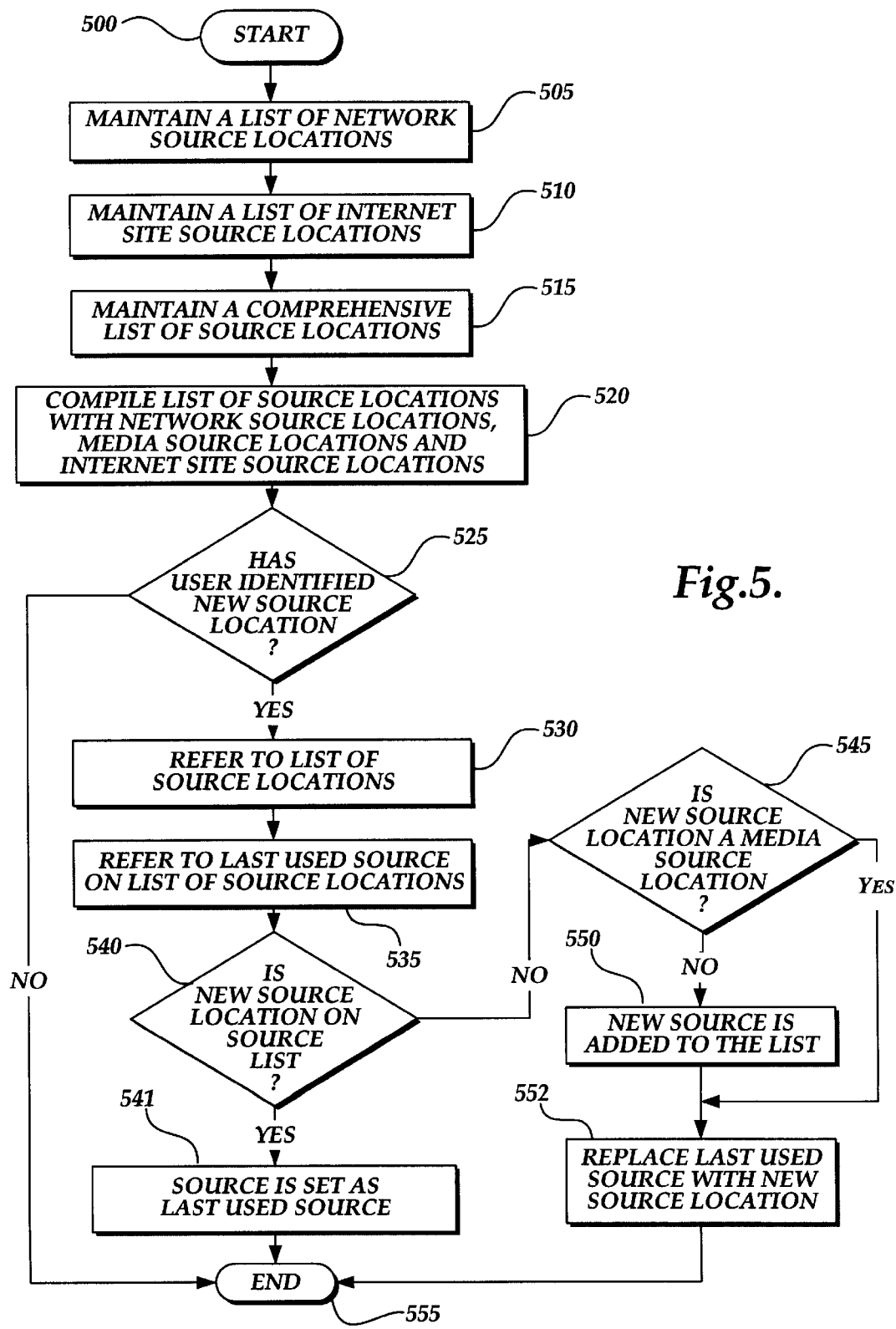
FIG. 5 is a flow diagram depicting steps performed by an exemplary embodiment of the present invention to add a new source location to a source list.

FIG. 5 illustrates an overview of the steps involved in a process for maintaining the source list 212 or the patch source list 254 in the installer registry 202. After the product is installed or patched, the user or a system administrator may desire to review and revise the list of source locations stored in either the source list 212 for the original source 215 or the patch source list 254 for the patch package 250. Although the following discussion describes a process for maintaining the source list 212, it will be understood that the same process may be performed to maintain the patch source list 254.

The process begins at START step 500 by turning on the computer 20. At step 505, the installer application maintains a list of network source locations. At step 510, the installer application 201 maintains a list of Internet site source locations. These lists are used to maintain a comprehensive list of source locations at step 515.

At step 520, the installer application 201 arranges the source list 212 by network source locations, media source locations, and Internet site source locations. After preparing the source list 212 at step 520, the installer application 201 determines whether the user has identified a new source location. If not, processing proceeds to step 555, where the process ends.

At step 530, if the user has identified a new source location, the installer application 201 refers to its comprehensive list of source locations. At step 535, the installer application 201 determines if the new source location identified by the user is already on the list of source locations. If so, at step 541, the source is set as the last-used source, and the process ends at step 555.

At step 545, if the new source location is not on the list of source locations, the installer application 201 determines whether the new source location is a media source location. If the new source location is not a media source location, processing proceeds to step 550, where the new source is added to the source list 212. The installer application 201 replaces the last-used source with the new source location at step 552, and the process ends at step 555. If, at step 545, the new source location is a media source location, the process proceeds directly to step 552, where the last-used source is replaced with the new source location. Processing then proceeds to step 555 and ends.

Software Configured to "Run From Source"

The examples set forth above illustrate the process of using, maintaining, and supplementing a source list in the context of an installation procedure, and a patch source list in the context of a patching procedure. However, the described method of using, maintaining, and supplementing those lists can also be adapted for application programs in which features are configured to run from source, rather than being installed onto the user's local hard disk drive. In this instance if a feature is configured to run from source and the original source location is unavailable, a source list can be used to attempt to locate an alternate valid source location. As in the examples set forth above, the application can refer to a source list to identify an alternate valid source location for the needed feature in the event the original source location is unavailable. The feature is then run from the alternate source.

Optionally the source list can be maintained, updated, and supplemented to change the primary source location or to add new source locations. In effect, this implementation is almost identical to the use of a source list for installing software, except that whereas a traditional application program executes software code stored on the user's local hard disk drive, an application configured to run features from source will read the code from the source location and execute the code at the new source location, wherever that may be.

Patch Source File

While the patch package 250 has been described to contain all the necessary components to perform the patching procedure described with respect to FIG. 2, it will be appreciated from a thorough reading of the above description that an abbreviated patch package my be used. The patch package 250 described above contains not only information for applying the patch, but also any new resources for installation. For instance, any new program files added by the patch are included within the patch package 250. If a patch is applicable to multiple versions of a product, each version may require a slightly different set of resources to revise the product. Accordingly, the patch package 250 described above can become large and burdensome if all the necessary resources are included to patch multiple versions of a product.

As an alternative, the actual resources, i.e., the program files and the like, may be contained in multiple patch source files and stored on a network server or other large-capacity storage medium for downloading to the user's computer 20 on an as-needed basis. Each of the multiple patch source files may contain the appropriate resources to revise one version of the product. An abbreviated patch package may be used that contains only the instructions for revising the product, including the multiple versions, affected by the patch. The abbreviated patch package may contain instructions for the proper method for revising the affected program files, either with patch bits, by adding new program files, or by replacing existing program files with new program files, for each version of the product. In addition, the abbreviated patch package includes patch source file locations for the multiple patch source files. As is known to those skilled in the art, the instructions for performing the revisions are nominal in storage requirements compared to the actual resources. In this manner, the abbreviated patch package may be stored on the hard disk drive 27 of the user's computer 20, while multiple patch source files, containing the actual resources for multiple versions of the product, are stored elsewhere.

Figure 6:
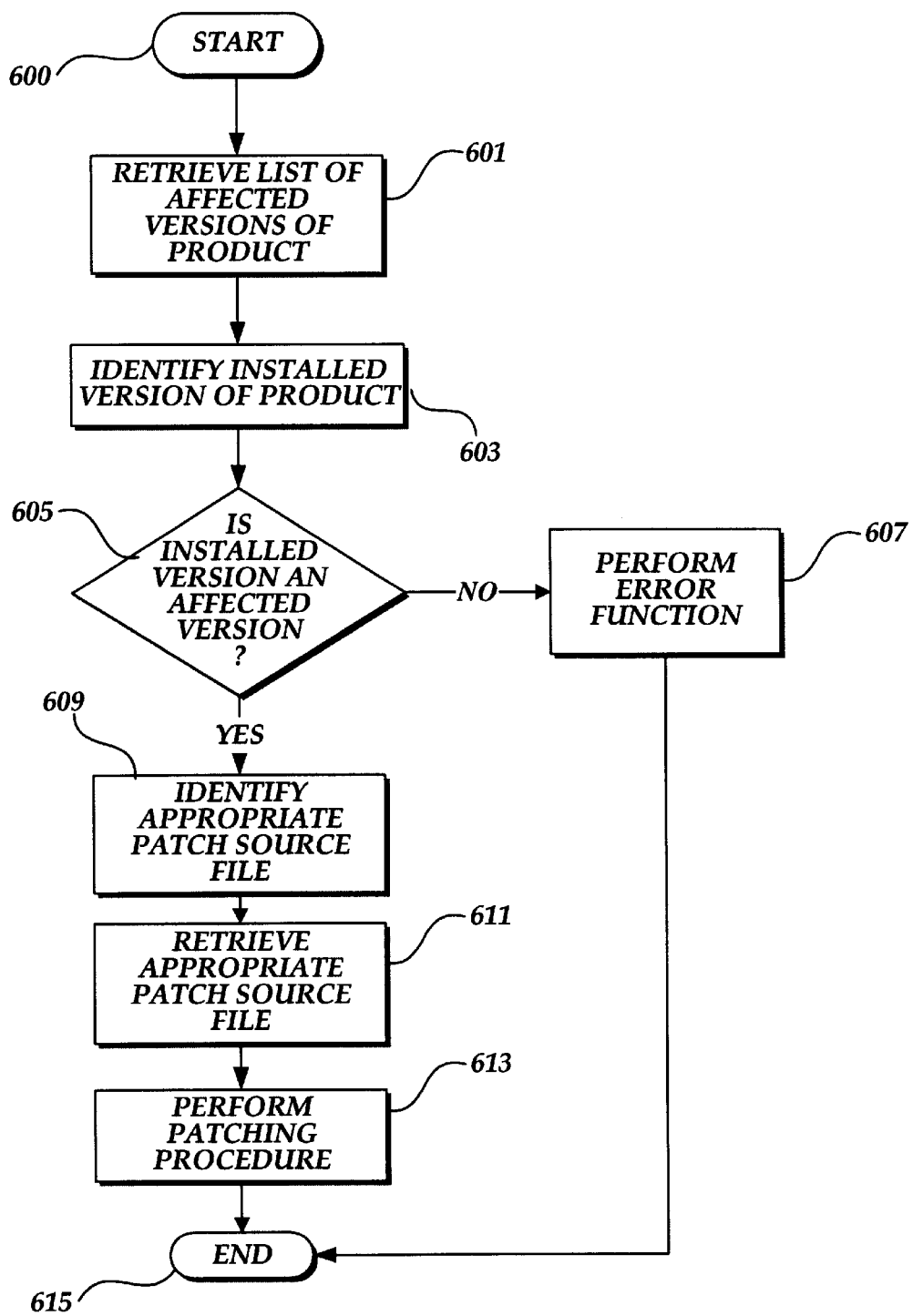
FIG. 6 is a logical flow diagram illustrating the steps performed by an alternative embodiment of the invention to apply a patch constructed in accordance with this alternative embodiment of the invention.

FIG. 6 is a logical flow diagram illustrating the steps performed by the installer application 201 described above to apply a patch constructed in accordance with this alternative embodiment of the invention. The process of FIG. 6 may occur when, as described above with respect to FIG. 2, the installer application 201 receives a notification that the abbreviated patch package has been launched. The process begins at step 600, where the installer application 201 has received the launch notification and processing proceeds at step 601.

At step 601, the installer application 201 reads the abbreviated patch package and uses the instructions stored within to determine the installation operations that must be performed to apply the patch. In this embodiment of the invention, those instructions include first identifying which version of the product is installed to determine which of the multiple patch source files is needed. Accordingly, the installer application 201 retrieves from the abbreviated patch package a list of versions of the product, with corresponding identifiers for the patch source files for each version. Processing continues at step 603.

At step 603, the installer application 201 identifies the version of the product installed by querying the installer registry 202. As mentioned above, during installation, the installer application 201 stored in the installer registry 202 configuration information related to the product. That configuration information includes the version of the product. Therefore, at step 603, the installer application 201 retrieves from the installer registry 202 the version of the product, and processing proceeds to step 605.

At step 605, the installer application 201 compares the version of the product with the list of versions retrieved from the abbreviated patch package. If the installed version of the product is not on the list of versions retrieved from the abbreviated patch package, the patch does not apply to the installed version of the product and processing proceeds to step 607 where an error function is performed. The error function may be to simply report to the user that the patch does not affect an installed product and terminate the patching procedure. If the installed version of the product is on the list of versions retrieved from the abbreviated patch package, processing proceeds to step 609.

At step 609, the installer application 201 retrieves from the list of versions of the product the identifier for the patch source file corresponding to that version of the product. In this manner, the installer application 201 is able to identify the patch source file that is applicable to the installed version of the product and avoid the unnecessary burden of retrieving resources associated with versions of the product that are not installed. Processing then continues at step 611.

At step 611, the installer application 201 retrieves the appropriate patch source file corresponding to the installed version of the product. As mentioned above, the abbreviated patch package includes patch source file locations where the multiple patch source files may be found. Those locations may be defined relative to the location of the abbreviated patch package. In essence, the abbreviated patch package contains an equivalent of the patch source list 254 for locating the patch package 250. Accordingly, the installer application 201 may perform as described above with respect to FIG. 4 to locate and retrieve the appropriate patch source file for the installed version of the product. In other words, the installer application 201 may search each of multiple locations, such as a network server or Internet locations, and retrieve the appropriate patch source file. After the appropriate patch source file is retrieved, processing proceeds to step 613.

At step 613, the installer application has retrieved the appropriate patch source file for the installed version of the product, and may now continue with the patching procedure as described above with respect to FIG. 2. More specifically, the installer application 201 revises the installed product in accordance with the instructions contained in the abbreviated patch package, and by using the resources contained in the appropriate patch source file. At this point, the process of FIG. 6 terminates at step 615, but it will be appreciated that any additional operations described above with respect to FIG. 2 are equally applicable to this embodiment of the invention. For instance, the list, contained in the abbreviated patch package, of versions of the product, with corresponding identifiers for the multiple patch source files, may be stored in the installer registry 202 as described above regarding the patch source list 254.

Finally, it will be understood that the preferred embodiment has been disclosed by way of example, and that other modifications may occur to those skilled in the art without departing from the scope and spirit of the appended claims.

The embodiments of the invention in which an exclusive property or privilege is claimed are defined as follows:

1. In a computer system, a method of locating a patch file used for patching an installed application program, comprising:
    in response to the occurrence of an event requiring the patch file, searching for the patch file in a first location;
    if the patch file is not found in the first source location, iterating through a list of alternative locations for the patch file to identify a valid alternative location for the patch file; and
    if the valid alternative location for the patch file is identified, reading the patch file from the valid alternative location.

2. The method of claim 1, wherein the iterating step comprises:
    retrieving from the list of alternative locations a current search location;
    attempting to locate the patch file at the current search location;
    in response to a failure to locate the patch file at the current search location, retrieving from the list of alternative locations a new search location; and
    attempting to locate the patch file at the new search location.

3. The method of claim 2, further comprising, if the list of alternative locations does not contain a new search location, terminating the iterating step.

4. The method of claim 2, further comprising:
    if the list of alternative locations does not contain a new search location, prompting a user to input a user-defined search location; and
    upon receipt of the user-defined search location, attempting to locate the patch file at the user-defined search location.

5. The method of claim 4, further comprising adding the user-defined search location to the list of alternative locations.

6. The method of claim 1, wherein the list of alternative locations comprises a plurality of path identifiers, each path identifier in the plurality of path identifiers defining an alternative location for searching for the patch file.

7. The method of claim 6, further comprising prioritizing each path identifier in the plurality of path identifiers into a search order hierarchy.

8. The method of claim 7, wherein the search order hierarchy is such that network source locations, media source locations, and Internet site source locations are categorized into different groups and are ordered within each group.

9. The method of claim 1, further comprising, after reading the patch file from the valid alternative location, performing a patching operation for revising the installed application program from a first version to a second version.

10. The method of claim 9, wherein the patching operation comprises:
    retrieving a new program file from the patch file; and
    adding the new program file to the application program.

11. A computer-implemented method for providing a list of alternative locations for locating resources related to an application program, comprising:
    recognizing an indication that a patch file has been launched, the patch file containing instructions for installing a new resource for the application program;
    creating, within an information store maintained by an installer program, a patch source list including a first location for a patch source file containing the new resource to be installed for the application; and
    including in the patch source list at least one alternative location for the patch source file.

12. The computer-implemented method of claim 11, wherein the patch file containing the instructions and the patch source file are contained in a patch package file.

13. The computer-implemented method of claim 11, further comprising performing patching operations for revising the application program from one version to a newer version.

14. The computer-implemented method of claim 13, wherein the performing patching operations step comprises:
    reading the instructions for installing the new resource from the patch file;
    retrieving the new resource from the patch source file; and
    executing the instructions for installing the new resource, wherein the instructions include adding the new resource to the application program.

15. The computer-implemented method of claim 14, wherein the retrieving the new resource step comprises:
    accessing the patch source list to identify the first location for the patch source file;
    searching the first location for the patch source file to verify the existence of the patch source file at the first location; and in response to a failure to verify the existence of the patch source file at the first location, accessing the patch source list to identify the alternative location for the patch source file.

16. The computer-implemented method of claim 15, wherein the new resource is a new program file.

17. The computer-implemented method of claim 15, wherein the new resource is a multiplicity of patch bits for altering an existing program file of the application program.

18. A computer-readable medium having computer executable instructions for locating an alternative source of installable program files for an application, which when executed perform steps comprising:

in response to an indication that an installation procedure is requested, identifying a program file selected during the installation procedure for installation to a computer system, the program file being associated with a patch to the application;

attempting to retrieve the program file from an expected location for a patch source containing the program file;

in response to a failure to locate the patch source at the expected location, accessing a patch source list describing at least one alternative location for the patch source; and attempting to retrieve the program file from the patch source at the at least one alternative location.

19. A computer-implemented method for patching an application program, comprising:

retrieving a list of affected versions of the application program, the list of affected versions describing each of a plurality of versions of the application program affected by a patch for the application program, each version of the application in the plurality of versions having a separate and corresponding patch source file containing resources related to the version of the application program;

identifying an installed version of the application program on a local computer system;

comparing the installed version of the application to the list of affected versions to identify an appropriate patch source file corresponding to the installed version, the patch source file containing resources for revising the installed version of the application; and retrieving the appropriate patch source file from a remote computer system.

\* \* \* \* \*

UNITED STATES PATENT AND TRADEMARK OFFICE
CERTIFICATE OF CORRECTION

PATENT NO.     : 6,317,880 B1
DATED          : November 13, 2001
INVENTOR(S)    : B.C. Chamberlain et al.

It is certified that error appears in the above-identified patent and that said Letters Patent is hereby corrected as shown below:

<u>Title page,</u>
Item [56], References Cited, OTHER PUBLICATIONS, insert in appropriate order:

-- Kelly, M., "Gain Control of Application Setup and Maintenance with the New Windows Installer," *Microsoft Systems Journal*, Sep. 1998, pp. 15-27. --

Signed and Sealed this

Twenty-sixth Day of November, 2002

*Attest:*

*Attesting Officer*

JAMES E. ROGAN
*Director of the United States Patent and Trademark Office*